United States Patent Office 2,749,316
Patented June 5, 1956

---

2,749,316

STABILISED SODIUM ALUMINATE

Kenneth Bernard Coates, South Kensington, London, England, assignor to Imperial Chemical Industries Limited, a corporation of Great Britain No Drawing. Application May 5, 1952,
Serial No. 286,207

Claims priority, application Great Britain August 17, 1951

4 Claims. (Cl. 252—182)

This invention relates to compositions which consist preponderantly of sodium aluminate and which, on dissolution in water, yield clear, substantially colorless solutions which are stable on standing for prolonged periods.

The particular object of the invention is to provide a dry powdered form of sodium aluminate intimately mixed with up to 2½% of a stabilising agent, so that on dissolving the product in water the traces of iron which get into the sodium aluminate during its manufacture are restrained from coloring the solution or being precipitated as discrete brown-colored particles. Sodium aluminate is used in the manufacture of paper and in the preparation of lake colors; and for such uses, in which the aluminium hydroxide is ultimately precipitated, colored or patchy precipitates would be objectionable. Even 0.01% $Fe_2O_3$ which precipitates is sometimes objectionable but the critical amount depends on the chemical or physical condition of the iron.

Dry sodium aluminate which contains molecular proportions of $Na_2O$ to $Al_2O_3$ of at least 1.3:1 is relatively stable and gives solutions in water which do not precipitate appreciable amounts of aluminium hydroxide. However, with less than 1.3 moles of $Na_2O$ per mole of $Al_2O_3$ in the sodium aluminate, the latter is somewhat unstable in water and aluminium hydroxide is precipitated. In order to get a low ratio aluminate, i. e. one containing less than 1.3 moles of $Na_2O$ per mole of $Al_2O_3$, which yields stable solutions of restricted alkalinity, it has previously been proposed to make a sodium aluminate product by drying solutions thereof to which a stabilising agent, such as Rochelle salt, a tartrate, saccharate, gluconate, pyrogallate, sugar, dextrin, starch, glycerol, glycol or phenolate, has been added, the heating of the solution during drying being limited to 200° C., so that a relatively hydrated product containing 20% water is obtained.

In contrast to these prior proposals, the present invention is concerned primarily, though not exclusively, with sodium aluminate compositions containing $Na_2O$ and $Al_2O_3$ in molecular ratio of at least 1.3:1, which have been dried by heating until virtually anhydrous, so that the water content is reduced to 5% or less and in which there is present an unavoidable trace of iron which has occurred due to the presence of soluble iron compounds at some stage of manufacture or has been picked up during drying or other processing in iron vessels. Such compositions may contain as little as 0.01% $Fe_2O_3$ but in fact anhydrous sodium aluminate generally contains from 0.03 to 0.1% $Fe_2O_3$.

When such substantially anhydrous and highly alkaline sodium aluminate, containing traces of iron oxide as impurity, is dissolved in water, the solution obtained is neither clear nor colorless. It becomes necessary to find some means of dissolving this iron in the aqueous sodium aluminate solution without interfering with the precipitation of aluminium hydroxide when the solution is used in papermaking or similar applications involving its precipitation. Moreover, the iron must remain dissolved during this precipitation of aluminium hydroxide, which is normally effected by dilution or by addition of such reagents as will lower the pH of the solution. Furthermore, if an additive is used for keeping the iron dissolved it must be virtually inert to all other processes involved and must only be used commercially in relatively small amounts.

It has been found that substances which are normally used in large excess to prevent precipitation of iron and aluminium during chemical analysis, and those proposed for stabilising the more or less hydrated form of low alkalinity sodium aluminate described above, such as tartaric acid or Rochelle salt, are insufficiently effective in industrially practicable amounts to give clear colorless stable solutions of the substantially anhydrous aluminate containing iron as impurity, suitable for use in paper or color lake industries. However, we have discovered that mannitol and/or sorbitol, and apparently only these two compounds, stabilise solutions of anhydrous sodium aluminate containing traces of iron sufficiently to give clear, colorless solutions which remain clear and colorless even after standing for many days. Moreover, when aluminium hydroxide is precipitated from these stabilised solutions during the processes of papermaking or lake manufacture, the precipitate is uniformly white.

Mannitol and sorbitol are asymmetric hexahydric alcohols and both have been found to have essentially the same effect in solubilising the iron impurity in alkaline sodium aluminate. The proportion of stabilising agent employed might be varied, dependent upon the quantity of iron oxide present as impurity. Generally speaking, the stabilising agent should be used in a quantity sufficient to prevent precipitation of the iron oxide when the aluminate is dissolved in water. Under preferred conditions, from ¼ to 2½% by weight of the sodium aluminate should be stabilising agent.

According to a specific embodiment of our invention, therefore, we provide a dry composition comprising an intimate mixture of powdered, virtually anhydrous sodium aluminate containing about 1.3 moles of $Na_2O$ per mole of $Al_2O_3$, traces of iron oxide, and from ¼ to 2½% by weight of a stabiliser selected from the group consisting of mannitol and sorbitol. With 0.01% $Fe_2O_3$ present in the sodium aluminate, ¼% of mannitol or sorbitol is sufficient to produce the desired effect; with 0.1% $Fe_2O_3$ present, 2–2½% of mannitol or sorbitol is required. The resulting mixtures are stable on keeping for long periods and dissolve in water to produce clear, colorless, stable solutions.

In its broadest aspects, our invention comprises stabilised sodium aluminate containing from 1.2 to 1.4 moles of $Na_2O$ per mole of $Al_2O_3$, a trace of iron oxide as impurity, and a stabiliser selected from mannitol and sorbitol in sufficient amount to prevent the trace of iron oxide present from precipitating upon dissolution of the aluminate in water.

For application where the stabilised sodium aluminate is to be dissolved in hard waters containing calcium and/or magnesium, we prefer also to incorporate therein a sequestering agent to prevent precipitation of the calcium or magnesium. Any of the conventional sequestering agents may be used although the preferred agent is the disodium salt of ethylenediamine tetra acetic acid. The amount of sequestering agent added depends upon the hardness of the water, but 5% by weight of the preferred agent in the stabilised aluminate will produce a clear solution in a water of 200 p. p. m. hardness in terms of $CaCO_3$.

In a further feature, therefore, our invention also comprises sodium aluminate which forms clear, colorless solutions on dissolving in water, containing 50–54% by weight of $Al_2O_3$, 39–42% by weight of $Na_2O$, ¼–2½% by weight of a stabiliser selected from the group consisting of mannitol and sorbitol, and ½–3% by weight of disodium ethylenediamine tetra acetate, the remainder being water and traces of iron oxide.

All the above compositions may be made by milling the aluminate and additives together in standard mixing equipment in the appropriate proportions. As the proportions of additive are small, we prefer to mix together a small proportion of the aluminate with all the additive, and to use this as a master batch to mix with the remainder of the aluminate and thus make it easier to prepare an intimate mixture. For reasons of adequate mixing, we prefer to use mannitol because it is a solid not only at ordinary temperatures but also at somewhat elevated temperatures. Ribbon mixers, pug mills and similar equipment may be used, and the mixing should be continued energetically for at least 5 minutes, preferably for from 10 to 15 minutes to insure thorough mixing of the aluminate and additives.

The invention is illustrated but not restricted by the following example showing the use of mannitol as a stabilising agent for anhydrous sodium aluminate.

*Example*

To 100 parts by weight of anhydrous sodium aluminate powder, containing about 1.3 moles of $Na_2O$ per mole of $Al_2O_3$, and 0.05% $Fe_2O_3$ as impurity, was added 1 part by weight of mannitol in the form of a dry powder, and the whole mass was then thoroughly mixed in a ribbon mixer for 15 minutes. A uniform free-flowing powder was obtained which remained unchanged and free-flowing on storage in a sealed bottle. 2½ parts by weight of the composition were dissolved in 100 parts by weight of soft water and gave a clear colorless solution which remained clear and colorless after standing for 11 days in a stoppered bottle.

Substantially equivalent results were obtained using sorbitol in lieu of the mannitol utilised in the preceding example or mixtures of sorbitol and mannitol.

The novel principles of this invention are broader than the specific embodiments recited above and, rather than unduly extend this disclosure by attempting to list all the numerous modifications which have been conceived and reduced to practice during the course of this development, these novel features are defined in the following claims.

I claim:
1. As a new composition of matter, substantially anhydrous sodium aluminate containing about 1.3 moles of $Na_2O$ per mole of $Al_2O_3$, a trace of iron oxide as impurity and from ¼ to 2½% by weight, based on the iron-oxide containing aluminate, of a stabiliser which prevents precipitation of the iron oxide impurity on dissolution of said composition in water, said stabiliser being selected from the group consisting of mannitol and sorbitol.

2. The composition of claim 1 including the sequestering agent disodium ethylenediamine tetra acetate.

3. A composition of matter consisting essentially of a dry mixture of powdered substantially anhydrous sodium aluminate containing from 1.2 to 1.4 moles of $Na_2O$ per mole of $Al_2O_3$ and from 0.01 to 0.1% by weight of iron oxide as impurity, and from ¼ to 2½% by weight of the iron oxide-containing aluminate of a stabiliser which prevents precipitation of said iron oxide impurity on dissolution of said composition in water, said stabiliser being selected from the group consisting of mannitol and sorbitol.

4. As a new composition of matter, substantially anhydrous sodium aluminate in a form which provides a clear, colorless solution in water, said sodium aluminate comprising from 50 to 54% by weight of $Al_2O_3$, 39 to 42% by weight of $Na_2O$, ¼ to 2½% by weight of a stabiliser selected from the group consisting of mannitol and sorbitol and ½ to 3% by weight of disodium ethylenediamine tetra acetate, the remainder being water and traces of iron oxide.

References Cited in the file of this patent

UNITED STATES PATENTS

| | | |
|---|---|---|
| 1,157,436 | Spence et al. | Oct. 19, 1915 |
| 2,345,134 | Lindsay et al. | Mar. 28, 1944 |
| 2,544,649 | Bersworth | Mar. 13, 1951 |

OTHER REFERENCES

Thorpe's Dictionary of Applied Chemistry, vol. 7, 4th ed. 1946, page 504; vol. 2, 4th ed. 1938, pages 282, 296. Longmans, Green and Co., N. Y. C.

Paper Trade J., v. 110, No. 8, pp. 131–3 (1940).